(12) United States Patent
Byrne et al.

(10) Patent No.: US 10,268,767 B2
(45) Date of Patent: *Apr. 23, 2019

(54) ACQUISITION AND TRANSFER OF TACIT KNOWLEDGE

(71) Applicant: International Business Machines Corporation, Armonk, NY (US)

(72) Inventors: Matthew Byrne, Dublin (IE); Benjamin S. Caldwell, Lexington, KY (US); Stephen W. Cole, Cambridge, MA (US); Patrick J. O'Sullivan, Ballsbridge (IE); Stephen P. Ryan, County Wicklow (IE)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/737,636

(22) Filed: Jun. 12, 2015

(65) Prior Publication Data
US 2016/0182660 A1    Jun. 23, 2016

Related U.S. Application Data

(63) Continuation of application No. 14/575,267, filed on Dec. 18, 2014.

(51) Int. Cl.
*H04L 29/08* (2006.01)
*G06F 17/30* (2006.01)

(52) U.S. Cl.
CPC .. *G06F 17/30867* (2013.01); *G06F 17/30539* (2013.01); *G06F 17/30864* (2013.01);
(Continued)

(58) Field of Classification Search
CPC ......... G06F 17/30867; G06F 17/30539; G06F 17/30864; H04L 67/306; H04L 67/10; H04L 67/22
See application file for complete search history.

(56) References Cited

U.S. PATENT DOCUMENTS 8,417,696 B2    4/2013 Gupta et al.
8,683,557 B1    3/2014 Desikan et al.
(Continued)

FOREIGN PATENT DOCUMENTS

WO    2012151419 A1    11/2012
WO    WO 2012151419 A1 * 11/2012    ......... G06F 21/6218

OTHER PUBLICATIONS

"A System and Method for providing secure shared access to Website accounts via decentralized delegation of permission", An IP.com Prior Art Database Technical Disclosure, IP.com No. 000215499, Published Mar. 2, 2012, <http://ip.com/IPCOM/000215499>.
(Continued)

*Primary Examiner* — Mark D Featherstone
*Assistant Examiner* — Faezeh Forouharnejad
(74) *Attorney, Agent, or Firm* — Christopher K. McLane; Daniel R. Simek

(57) ABSTRACT

In an approach for transferring data between user accounts, a computer receives a request to transfer data from a first user account to at least a second user account. The computer identifies the first user account and the at least second user account. The computer determines activity associated with the first user account. The computer determines relevant activity from the determined activity associated with the first user account based on the received request.

8 Claims, 2 Drawing Sheets

(52) U.S. Cl.
CPC .......... *H04L 67/306* (2013.01); *H04L 67/10* (2013.01); *H04L 67/22* (2013.01)

(56) References Cited

U.S. PATENT DOCUMENTS

| | | | | |
|---|---|---|---|---|
| 9,171,068 | B2* | 10/2015 | Xu | G06F 17/30867 |
| 2009/0106390 | A1* | 4/2009 | Kirwan, Jr. | G06Q 10/10 |
| | | | | 709/217 |
| 2012/0290660 | A1 | 11/2012 | Rao et al. | |
| 2013/0078598 | A1* | 3/2013 | Dunne | G09B 19/00 |
| | | | | 434/128 |
| 2013/0132384 | A1* | 5/2013 | Bohm | G06F 17/30283 |
| | | | | 707/736 |
| 2013/0219517 | A1 | 8/2013 | Yerli | |
| 2013/0253991 | A1* | 9/2013 | Barhate | G06Q 10/00 |
| | | | | 705/7.36 |
| 2014/0020054 | A1* | 1/2014 | Lim | G06F 17/3089 |
| | | | | 726/1 |
| 2014/0032259 | A1* | 1/2014 | LaFever | G06Q 30/0201 |
| | | | | 705/7.29 |
| 2014/0123254 | A1 | 5/2014 | McBrearty | |
| 2014/0351346 | A1* | 11/2014 | Barton | H04L 51/00 |
| | | | | 709/206 |
| 2015/0341454 | A1* | 11/2015 | Sims | G06F 17/30058 |
| | | | | 709/204 |
| 2016/0078203 | A1* | 3/2016 | Moloian | G06F 21/31 |
| | | | | 726/17 |

OTHER PUBLICATIONS

List of IBM Patents or Patent Applications Treated as Related, Filed Herewith.
Matthew Byrne, et al., "Acquisition and Transfer of Tacit Knowledge", U.S. Appl. No. 14/575,267, filed Dec. 18, 2014.

* cited by examiner

ACQUISITION AND TRANSFER OF TACIT KNOWLEDGE

BACKGROUND OF THE INVENTION

The present invention relates generally to the field of knowledge management, and more particularly to acquiring and transferring tacit knowledge between users.

Knowledge management refers to a multi-disciplined approach encompassing the process of capturing, developing, sharing, and effectively using knowledge to achieve organizational objectives (e.g., improved performance, competitive advantage, innovation, sharing of lessons learned, integration, and continuous improvement). Knowledge is a familiarity, awareness, or understanding of someone or something acquired through experience or education (e.g., facts, information, descriptions, or skills). Knowledge may be broken into two categories, explicit and tacit. Explicit knowledge is knowledge that has been articulated, codified, and stored in certain media and can be easily conveyed to others (e.g., information contained in encyclopedias and textbooks). Tacit knowledge, however, is knowledge that people are not often consciously aware of (e.g., how to perform a particular task) and is difficult to convey to others through writing or verbalizing.

When individuals utilize computers and the Internet, digital footprints (e.g., digital shadows) are created. Digital footprints refer to the trails or traces of information left behind in a digital environment (e.g., forum registrations, e-mails, uploads, images, activity, etc.), which may be stored as cookies (i.e., small pieces of data sent from a website and stored in the browser of the user tracking online activity). Digital footprints also reside within computer memory as files, indicating actions performed on a computing device (e.g., performed actions, data accessed, programs utilized, etc.). Based on the digital footprints, knowledge about the individual and the information which may have been accessed and/or created by the user may be discerned through data collection techniques and analyses, such as spider programs, text analytics, and data mining gather knowledge (e.g., gather explicit or tacit knowledge).

Spider programs are software programs or automated scripts that travel the Web, locating data and indexing information that are also capable of extracting information (e.g., e-mail addresses, search information, frequency) associated with an individual (e.g., user). Text analytics (e.g., text mining) refers to the process of deriving high quality information (e.g., relevant and novel) from text by discerning patterns and trends within the structure of the input text (e.g., utilizes parsing and derived linguistic features). Data mining discovers patterns in large data sets, including: associations (e.g., relationships between variables), clustering (e.g., similar groups and structures), and classification (e.g., applying a known structure to new data), and summarization (e.g., compact representation of the data set).

SUMMARY

Aspects of the present invention disclose a method, computer program product, and system for transferring data between user accounts. The method includes one or more computer processors receiving a request to transfer data from a first user account to at least a second user account. The method further includes one or more computer processors identifying the first user account and the at least second user account. The method further includes one or more computer processors determining activity associated with the first user account. The method further includes one or more computer processors determining relevant activity from the determined activity associated with the first user account based on the received request.

DETAILED DESCRIPTION

With tacit knowledge, people are not often aware of the knowledge they possess or how valuable the knowledge may be to others. In some cases, to effectively transfer tacit knowledge, extensive personal contact, regular interactions, and trust between individuals is needed (e.g., a mentor-mentee relationship, where skills are learned through observation, imitation, and practice). In other instances, tacit knowledge may be garnered through practice in a particular context and transmitted through social networks (e.g., to some extent, tacit knowledge is "captured" when the knowledge holder joins a community or network). As recognized by embodiments of the present invention, transferring tacit knowledge may not always be possible, thus resulting in: a loss of tacit knowledge, an increased burden on an organization, and hinders the individual assuming responsibilities of a predecessor (e.g., diminished likelihood of success due to a lack of knowledge). Embodiments of the present invention acquire tacit knowledge from an identified source (e.g., owner) and provide the acquired tacit knowledge to a designated recipient for use, lessening the loss of tacit knowledge.

Figure 1:
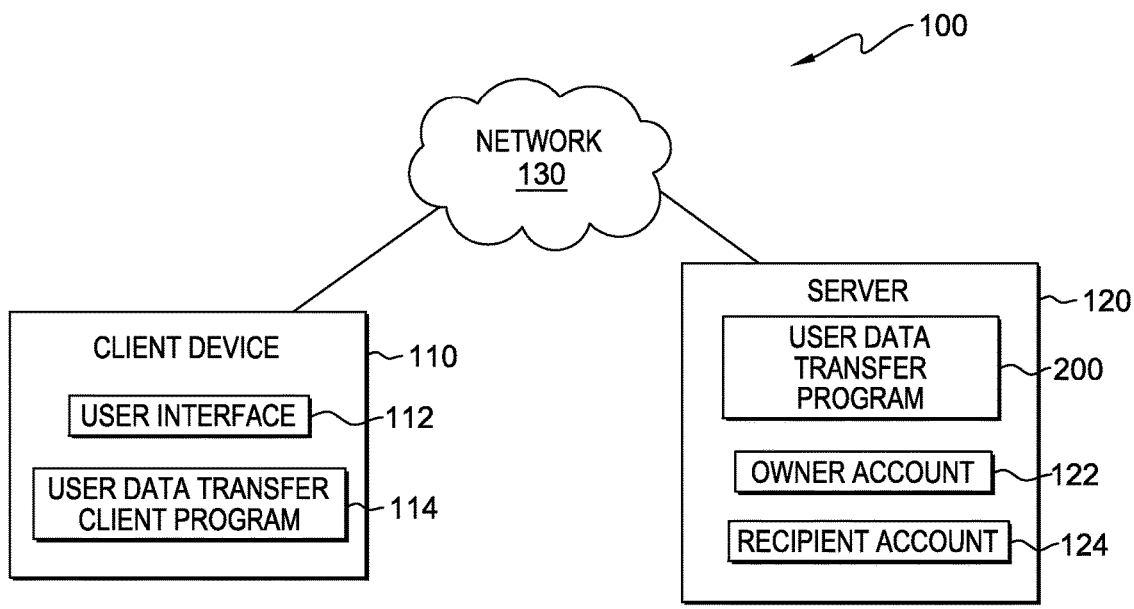
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110 and server 120 interconnected over network 130. Distributed data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112 and user data transfer client program 114.

User interface 112 is a program that provides an interface between a user of client device 110 and a plurality of applications that reside on client device 110 (e.g., user data transfer client program 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through user data transfer client program 114 to user data transfer program 200.

User data transfer client program 114 operates to access user data transfer program 200 via network 130. User data transfer client program 114 provides user interface 112 with user accounts (e.g., owner account 122 and recipient account 124) and other data transfer options available for selection and user input prior to execution of user data transfer program 200. In the depicted embodiment, user data transfer client program 114 resides on client device 110. In other embodiments, user data transfer client program 114 may reside on other devices, such as server 120, provided that user data transfer client program 114 is accessible to user interface 112, and provided user data transfer client program 114 has access to user data transfer program 200, owner account 122, and recipient account 124.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains owner account 122, recipient account 124, and user data transfer program 200.

Owner account 122 and recipient account 124 are user accounts associated with individual users. A user account is a collection of information interacting with an operating system accessed with a user name (e.g., user id) and passwords. User accounts include relevant data to a user, such as a user profile, application settings, user data folder, user-specific folders, security privileges and policy settings, and file system permissions. User profiles include operating system preferences that are defined separately for a user account (e.g., wallpaper, side bar configurations, and application shortcuts). Application settings include personal user preferences for applications (e.g., default paths, toolbar layouts). A user data folder is a folder specific to the user identifying a specific location on the computer for data storage to maintain separate files from another user of the same device. User specific folders are default special folders created for an individual with a shortcut (e.g., documents, music, pictures, downloads, etc.). Security privileges and policy settings are set for a user account identifying a set of security related actions a user may perform (e.g., logon hours, installing and removing applications, etc.). File system permissions include details regarding actions a user may perform and on which files (e.g., user may change files in a user data folder but not change system files). Owner account 122 is the source of user account information, which user data transfer program 200 extracts and removes. Recipient account 124 receives the extracted user account information from owner account 122 via user data transfer program 200. In the depicted embodiment, owner account 122 and recipient account 124 reside on server 120. In other embodiments, owner account 122 and recipient account 124 may reside on another server or other devices, such as client device 110 connected over network 130, provided owner account 122 and recipient account 124 are accessible by user data transfer client program 114 and user data transfer program 200.

User data transfer program 200 is a program capable of identifying and extracting relevant information (e.g., contacts, connections, blogs, etc.) from owner account 122 and transferring the identified relevant information to recipient account 124. User data transfer program 200 receives two distinct accounts through user data transfer client program 114, owner account 122 (e.g., source of information) and recipient account 124 (e.g., receiver of information). In addition, user data transfer program 200 receives additional information from user data transfer client program 114 specifying the type of information to be acquired from owner account 122 (e.g., all information, information associated with key words, etc.). In the depicted embodiment, user data transfer program 200 resides on server 120. In another embodiment, user data transfer program 200 may reside on client device 110. In other embodiment, user data transfer program 200 may reside on other servers and computing devices not shown, connected over network 130, provided user data transfer program 200 is accessible by user data transfer client program 114 and has access to owner account 122 and recipient account 124.

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Figure 2:
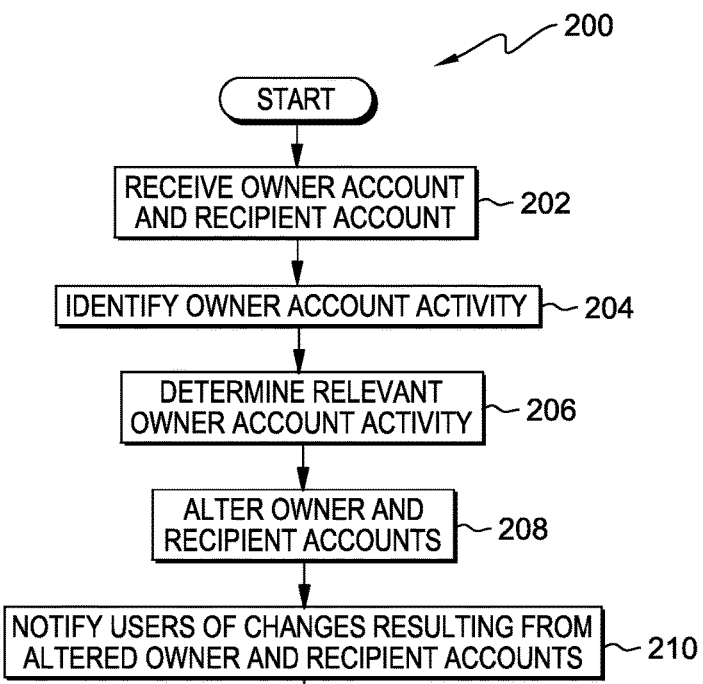
FIG. 2 is a flowchart depicting operational steps of a user data transfer program on a server within the data processing environment of FIG. 1 for identifying, extracting and transferring information from one user account to a second user account, in accordance with an embodiment of the present invention.

FIG. 2 is a flowchart depicting operational steps of user data transfer program 200, a program for identifying, extracting, and transferring information from one user account to a second user account, in accordance with an embodiment of the present invention. In one embodiment, user data transfer program 200 may transfer information between two user accounts, such as owner account 122 and recipient account 124. In another embodiment, user data transfer program 200 may transfer information from owner account 122 to one or more accounts represented by recipient account 124 (e.g., more than one account may be designated to receive information from owner account 122).

In step 202, user data transfer program 200 receives owner account 122 and recipient account 124 through user data transfer client program 114. User data transfer program 200 provides user data transfer client program 114 with available user accounts allowing a user to select owner account 122 and recipient account 124 (e.g., a text list of user accounts, icons, etc.). In one embodiment, user data transfer program 200 receives owner account 122 and recipient account 124 when a user selects owner account 122 and then drags and drops owner account 122 into recipient account 124. In another embodiment, user data transfer program 200 receives a selection of owner account 122 and recipient account 124 in response to user data transfer client program 114 displaying prompts to identify an owner and recipient. For example, a team lead in a department is taking a leave of absence, and a backup has been identified to act in the absence of the team lead. The department manager initiates user data transfer program 200, and user data transfer program 200 presents the manager with a list of employee icons within the department. The manager selects the icon associated with the team lead (e.g., owner account 122) and drags the icon over the icon associated with the backup (e.g., recipient account 124). The manager then drops the icon associated with the team lead into the icon for the backup via user interface 112.

In step 204, user data transfer program 200 identifies owner account 122 activity (e.g., information regarding the interactions of a user, computing devices, and online resources). In response to receiving owner account 122 and recipient account 124, user data transfer program 200 initiates the identification of information (e.g., data sets, applications, contacts, etc.) utilized by owner account 122. In one embodiment, user data transfer program 200 may receive a selection through user data transfer client program 114 to identify all information utilized by owner account 122. For example, when the individual associated with owner account 122 will no longer be working within the organization, limitations may not be placed on the information identified to prevent the loss of important information. In another embodiment, user data transfer program 200 may receive specific information (e.g., keywords, account number, etc.) as a selection through user data transfer client program 114 to identify a subset of information utilized by owner account 122. For example, a single sales account is to be transferred from one individual to another; therefore, only the information utilized associated with the identified sales account needs to be identified for transfer, and owner account 122 maintains information regarding remaining sales accounts.

User data transfer program 200 identifies owner account 122 activity through digital footprints left by actions taken by the user of owner account 122. Digital footprints refer to the trails or traces of information left behind in a digital environment stored within cookies (i.e., small pieces of data sent between a website and browser) and files within computer memory as files (e.g., activity report, audit files). For example, user data transfer program 200 identifies websites accessed by owner account 122 by retrieving the web browsing history (i.e., list of websites accessed over a period of time). In conjunction with the associated stored cookies, user data transfer program 200 gathers additional information associated with the websites (e.g., user actions and data about the user). User data transfer program 200 is also able to identify e-mails that are sent and files (e.g., created, accessed, attached, etc.) as these actions are included in the digital footprints. User data transfer program 200 then compiles the identified activity as results (e.g., plurality of applications, data sets, contacts, blogs, communities, etc.) for owner account 122 into a consolidated usable format (e.g., graph, tree structure, linked nodes, table, ordered list, etc.) for further processing.

In step 206, user data transfer program 200 determines relevant activity for owner account 122. User data transfer program 200 determines relevant activity for owner account 122 by applying one or more techniques (e.g., spider programs, text analytics, natural language processing, data mining, user direction, etc.) to the activity identified through the digital footprints (step 204). After applying one or more of the aforementioned techniques, user data transfer program 200 may compare the resulting information to predetermined settings to determine relevance. Predetermined settings may include minimum values for relevance based on thresholds, rankings, percentage of use, activity level, etc. In one embodiment, user data transfer program 200 utilizes predetermined settings to determine relevance (e.g., user data transfer program 200 determines relevance by meeting or exceeding a minimum value). In another embodiment, user data transfer program 200 receives a modification to a predetermined setting from a user through user data transfer client program 114 (e.g., transfer all information related to a specific account number regardless of activity to maintain history). As user data transfer program 200 identifies activity that is not relevant, user data transfer program 200 removes the non-relevant data from the determined activity within the consolidated usable format (step 204) and provides relevant activity (i.e., reduced number of results). For example, in a graphical tree structure representation, user data transfer program 200 removes non-relevant branches from the original tree structure and displays a reduced tree structure with the remaining relevant branches.

In one embodiment, user data transfer program 200 may utilize a spider program to determine relevant activity within the identified activity associated with owner account 122. For example, user data transfer program 200 utilizes a spider program that locates and indexes the data from within the identified activity, and user data transfer program 200 assigns rankings based on the frequency or number of times a "hit" occurs within the data, as set within the rules and policies of the spider program. User data transfer program 200 utilizes the assigned rankings with predetermined settings to determine relevant data (e.g., utilizes the ranking and the associated percentage to determine relevance). For example, a forum discussing marketing strategies for a sales account is accessed daily. Another forum for troubleshooting a printer error was accessed twice. Based on the frequency of access (e.g., recurrence of the forums within the digital footprint), user data transfer program 200 assigns a high ranking to the marketing strategies forum. User data transfer program 200 then compares the ranking to a minimum relevance threshold. User data transfer program 200 determines the frequency of access meets and/or exceeds the minimum relevance threshold and user data transfer program 200 determines the marketing strategies forum is relevant. In comparison, based on the low frequency of access, user data transfer program 200 assigns a low ranking to the printer error troubleshooting forum that is less than the minimum relevance threshold. Therefore, user data transfer program 200 determines the printer error troubleshooting forum is not relevant. User data transfer program 200 identifies the marketing strategies forum for transfer to recipient account 124 and removes the printer error troubleshooting forum from the determined activity (e.g., printer error troubleshooting forum will not be transferred).

In another embodiment, user data transfer program 200 utilizes text analytics with natural language processing (e.g., derives the meaning from human language within textual information) to determine relevant activity within the identified activity associated with owner account 122. User data transfer program 200 utilizes text analytics to identify text and then applies natural language processing and at least one set of dictionaries and rules to determine relevant activity for owner account 122. In one embodiment, user data transfer program 200 receives keywords from a user via user interface 112 (step 204). In another embodiment, user data transfer program 200 may determine key words based on information associated with owner account 122. For example, within an e-mail the phrase, "Sales manager for new account" is included in the subject line and/or message body. User data transfer program 200 identifies the phrases "sales manager" and "new account" in the context of a marketing department and determines a sales manager is a person responsible for handling customer accounts, and a new account is a recent addition to the customer accounts. User data transfer program 200 determines the information associated with the e-mail is therefore relevant. Another e-mail may include text, such as "today's lunch menu." As the meaning of the words separately or in combination do not relate to marketing, user data transfer program 200 determines the e-mail and associated information is not relevant and should not be transferred.

In some other embodiment, user data transfer program 200 may additionally utilize information extraction and data mining to acquire additional information and relevant activity. Continuing the example, the e-mail address, recipient's names, phone numbers, etc. may be extracted from the e-mail. User data transfer program 200 may identify portions of the extracted information, such as the e-mail extension from an e-mail address (e.g., @companyname.com). User data transfer program 200 may then locate additional correspondences based on locating the same extension associated with the e-mail addresses and determine additional relevant information (e.g., contacts and details about the new account, such as the company, ongoing work, issues, etc.) to transfer.

In yet another embodiment, user data transfer program 200 may utilize metadata to determine relevant activity within the identified activity associated with owner account 122. Metadata summarizes basic information about data (e.g., data associated with owner account 122, such as job title, role, department, permissions, groups, tags, amount of activity, etc.). User data transfer account 200 compares the metadata associated with owner account 122 with the metadata associated with recipient account 124 to determine the relevant activity. User data transfer program 200 determines relevant activity based upon logic associated with similarities and differences associated the compared metadata. For example, the metadata for owner account 122 includes a job role of customer resource manager, a tag identifying an account for client x, and belongs to group abc. The metadata for recipient account 124 also includes a job role of customer resource manager but does not include the tag for the account for client x, and the recipient account 124 is not a member of group abc. As the job roles are the same, user data transfer program 200 determines the account for client x and the membership in group abc are relevant and includes client x and group abc for transfer to recipient account 124. In another example, the metadata for recipient account 124 includes a job role of an account analyst and does not include the tag for the account for client x, and recipient account 124 is not a member of group 123. Through the comparison, user data transfer program 200 determines owner account 122 and recipient account 124 do not share the same job roles, and therefore, only access to the account for client x is relevant for transfer to recipient account 124.

In yet some other embodiment, user data transfer program 200 displays the activity for owner account 122 in a selectable format (e.g., interface) through user data transfer client program 114. In some other embodiment, user data transfer program 200 displays the activity in a selectable format as a reduced list of activity after user data transfer program 200 implements one or more of the aforementioned techniques. The user of client device 110 may then review the displayed information and select relevant activity to transfer to recipient account 124 based on personal knowledge. For example, user data transfer program 200 displays a listing of relevant activity via user interface 112 including product blogs, contacts, marketing and sales files (e.g., information is relevant to the sales account to be transferred), and corporate compliance training websites. The user of client device 110 selects the product blogs, contacts, and marketing and sales files as relevant and the corporate compliance training websites as non-relevant (e.g., corporate compliance training may not be necessary to perform duties associated with the sales account).

In step 208, user data transfer program 200 alters owner account 122 and recipient account 124. Once user data transfer program 200 identifies the relevant and non-relevant activity associated with owner account 122, user data transfer program 200 initiates the transfer of the relevant activity from owner account 122 to recipient account 124. User data transfer program 200 also identifies relevant resources recipient account 124 currently does not have access to and initiates the process of obtaining access to the relevant resources. In one embodiment, user data transfer program 200 may initiate the process of obtaining access for recipient account 124 and removing owner account 122. For example, the user of owner account 122 is leaving the company and has access to a restricted resource (e.g., requires a user id and password to access the information) for pricing data. User data transfer program 200 initiates a request to add recipient account 124 to the restricted resource and remove owner account 122. In some embodiments, user data transfer program 200 may only request to add recipient account 124 to a community. For example, the user of owner account 122 is going on a leave of absence, and the user of recipient account 124 is covering until the user of owner account 122 returns to work; therefore, both owner account 122 and recipient account 124 would maintain access. In some other embodiment, user data transfer program 200 may alter the request to allow access to relevant resources for a specified period of time. For example, a sales account is nearing closeout (i.e., business with the customer is reaching completion), and due to a new high profile sales account being awarded to the organization, the user of owner account 122 is reassigned to the new account. The user of recipient account 124 only needs access to the relevant resources until the time of closeout. User data transfer program 200 requests temporary access for recipient account 124 equal to the time remaining until closeout occurs.

In step 210, user data transfer program 200 notifies users of changes resulting from altered accounts. In one embodiment, user data transfer program 200 notifies the users of both owner account 122 and recipient account 124 of the changes to access. In another embodiment, user data transfer program 200 notifies the user of recipient account 124 of changes to access. Additionally, user data transfer program 200 may provide the user of owner account 122 and/or recipient account 124 with a notification regarding the change of access request, which the users of owner account 122 and/or recipient account 124 may approve or decline. For example, the user of owner account 122 is promoted to the manager of a department and transfers the responsibilities of a sales account to a peer within the department. The user of owner account 122 may mentor the user of recipient account 124, and thus may want to maintain access to a community to assist in the transition of roles. Conversely, the user of recipient account 124 may not require access to a resource and declines the request to join. For example, a blog is dedicated to user experiences on a product that is no longer supported by the organization. As the blog may not provide beneficial information to the user of recipient account 124, the user of recipient account 124 declines the request to initiate access to the blog. In one embodiment, user data transfer program 200 notifies the users of changes at the time a change is requested. In other embodiments, user data transfer program 200 notifies the user of changes at the time a change becomes active (e.g., access the resource by recipient account 124 is available). Once the access requested by user data transfer program 200 completes, recipient account 124 is able to access the transferred relevant activity (e.g., contacts, websites, blogs, forums, data files, etc. are accessible). In some other embodiment, user data transfer program 200 notifies the user of client device 110 (e.g., individual initiating the transfer of tacit knowledge between user accounts) of the changes resulting from the altered accounts (e.g., removal of access, adding of access, when change in access is implemented, etc.).

Figure 3:
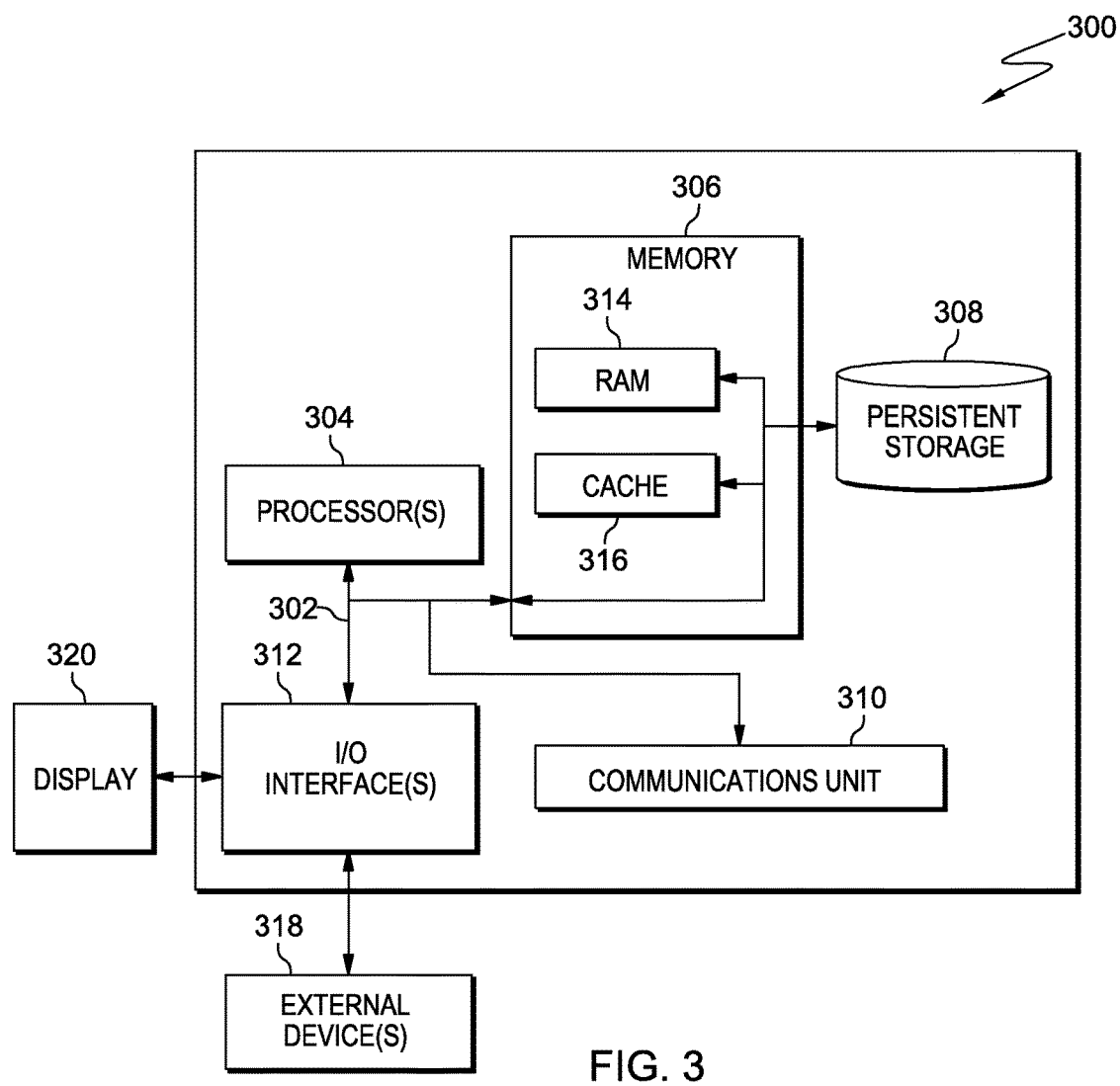
FIG. 3 is a block diagram of components of the server executing the user data transfer program, in accordance with an embodiment of the present invention.

FIG. 3 depicts a block diagram of components of distributed data processing environment 300, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Distributed data processing environment 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

User interface 112, user data transfer client program 114, owner account 122, recipient account 124, and user data transfer program 200 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of enterprise grid and client devices. In these examples, communications unit 310 includes one or more network interface cards. Communications unit 310 may provide communications through the use of either or both physical and wireless communications links. User interface 112, user data transfer client program 114, owner account 122, recipient account 124, and user data transfer program 200 may be downloaded to persistent storage 308 through communications unit 310.

I/O interface(s) 312 allows for input and output of data with other devices that may be connected to distributed data processing environment 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, user data transfer client program 114, owner account 122, recipient account 124, and user data transfer program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for transferring data between user accounts, the method comprising:

receiving, by one or more computer processors, a request to transfer data from a first user account to at least a second user account, wherein the data includes files relevant to a user of the first user account that are maintained separately from the second user account;

identifying, by one or more computer processors, the first user account and the at least second user account;

determining, by one or more computer processors, activity associated with the first user account, wherein the activity includes interactions of a user with other users, the user with a computing devices, and an online resources accessed by the user;

determining, by one or more computer processors, relevant activity from the determined activity associated with the first user account based on the received request and at least in part on predetermined settings, wherein the relevant activity includes information that is necessary to perform a duty, wherein the duty is associated with a job specific assignment associated with the first user account, wherein the predetermined settings include: a minimum value for relevance based on a threshold, a ranking, a percentage of use, a frequency of access, and an activity level; and transferring, by one or more computer processors, the determined relevant activity to the at least second user account based on the received request.

2. The method of claim 1, wherein the determined activity associated with the first user account comprises one or more digital footprints, wherein the one or more digital footprints represent actions performed by a user of the first user account on the computing devices and the online resources, wherein the one or more digital footprints are traces of information stored within small pieces of data between a website and a browser, and identify e-mail activity, and identify computer files that include an activity report and an audit file.

3. The method of claim 1, wherein determining the relevant activity from the determined activity associated with the first user account based on the received request and at least in part on predetermined settings further comprises:
identifying, by one or more computer processors, data to transfer based on the received request;
applying, by one or more computer processors, spider programs, text analytics, natural language processing, and data mining to the determined activity associated with the first user account based on the identified data to transfer;
receiving, by one or more computer processors, results from the applied spider programs, text analytics, natural language processing, and data mining; and
determining, by one or more computer processors, relevant activity from the received results based on applying predetermined settings to the received results, wherein the relevant activity includes: applications, data sets, files, and contacts, wherein the predetermined settings include a minimum values for relevance based on a threshold, a ranking, a percentage of use, and an activity level.

4. The method of claim 1 wherein determining the relevant activity from the determined activity associated with the first user account based on the received request and at least in part on predetermined settings, further comprises:
retrieving, by one or more computer processors, metadata associated with the first user account and metadata associated with the at least second user account, wherein the metadata includes: job title, role, department, permissions, a membership within one or more groups, tags, and amount of activity;

comparing, by one or more computer processor, the metadata associated with the first user account to the metadata associated with the at least second user account; and
determining, by one or more computer processors, the relevant activity based on the compared metadata, wherein the relevant activity is based on logic that identifies one or more similarities and one or more differences within the compared metadata.

5. The method of claim 1, further comprising:
displaying, by one or more computer processors, an interface that includes the determined activity associated with the first user account, wherein the interface is capable of receiving input selecting one or more instances of the determined activity associated with the first user account to be relevant activity.

6. The method of claim 1, further comprising:
identifying, by one or more computer processors, resources in the determined relevant activity associated with the first user account that the at least second user account does not have access to, wherein the resources include a restricted resource, a website, a blog, a forum, and a community, wherein the at least second user account is designated to receive the determined relevant activity associated with the first user account;
requesting, by one or more computer processors, a change in access for one or more of the following: the first user account and the at least second user account to the identified resources; and
notifying, by one or more computer processors, at least a user associated with the at least second user account of the requested change in access.

7. The method of claim 1, further comprising:
determining, by one or more computer processors, one or more keywords based at least in part on information associated with the first user account, text analytics, and natural language processing;
determining, by one or more computer processors, a subset of information within the first user account based on the determined one or more keywords; and
transferring, by one or more computer processors, the determined subset of information within the first user account to the at least second user account.

8. The method of claim 3, further comprising:
determining, by one or more computer processors, relevant activity from the received results based on applying predetermined settings to the received results, wherein the relevant activity includes one or more of the following: web sites, blogs, forums, and communities.

* * * * *